(12) United States Patent  (10) Patent No.: US 9,174,718 B1
Roach et al.  (45) Date of Patent: Nov. 3, 2015

(54) INTERNAL TOROID BALLOON

(71) Applicant: Google Inc., Mountain View, CA (US)

(72) Inventors: Kevin Roach, San Jose, CA (US); Nlkhil Singh Kohli, Menlo Park, CA (US); Richard Wayne DeVaul, Mountain View, CA (US); Sameera Sylvia Ponda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/041,637

(22) Filed: Sep. 30, 2013

(51) Int. Cl.
*B64B 1/58* (2006.01)
*B64B 1/40* (2006.01)

(52) U.S. Cl.
CPC ........................................ *B64B 1/40* (2013.01)

(58) Field of Classification Search
CPC .............. B64B 1/40; B64B 1/44; B64B 1/46; B64B 1/50; B64B 1/54; B64B 1/58; B64B 1/60; B64B 1/62; B64B 1/64
USPC ............................................. 244/31, 32, 128
See application file for complete search history.

(56) References Cited

U.S. PATENT DOCUMENTS

| | | | |
|---|---|---|---|
| 2,492,800 A * | 12/1949 | Isom | B64B 1/40 244/31 |
| 5,813,627 A | 9/1998 | Huntington | |
| 6,830,222 B1 | 12/2004 | Nock et al. | |
| 8,061,647 B1 | 11/2011 | Powell | |
| 2005/0040290 A1 | 2/2005 | Suhami | |
| 2006/0065777 A1* | 3/2006 | Walden | B64B 1/60 244/97 |
| 2008/0135678 A1* | 6/2008 | Heaven | B64B 1/60 244/30 |
| 2012/0228434 A1 | 9/2012 | Lopez Urdiales et al. | |
| 2013/0037650 A1 | 2/2013 | Heppe | |

FOREIGN PATENT DOCUMENTS

GB    2473450    3/2011

* cited by examiner

*Primary Examiner* — Christopher P Ellis
*Assistant Examiner* — Richard G Davis
(74) *Attorney, Agent, or Firm* — McDonnell Boehnen Hulbert & Berghoff LLP.

(57) ABSTRACT

A balloon having a balloon envelope that is fillable with a first lifting gas, a top plate arranged at a top of the balloon envelope, an outlet port that provides a passageway from an inside of the balloon envelope to the atmosphere, an inner bladder positioned within the balloon envelope and positioned at the top of the balloon envelope and coupled to the top plate, wherein the inner bladder is fillable with a second lifting gas, wherein the outlet port is configured to vent the first lifting gas to the atmosphere while keeping the second lifting gas in the inner bladder.

23 Claims, 8 Drawing Sheets

INTERNAL TOROID BALLOON

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

A balloon having a balloon envelope that is fillable with a first lifting gas is provided and an inner bladder that may be shaped as an inner toroid balloon is positioned within the balloon envelope. The inner bladder is coupled to a top plate at the top of the balloon envelope and may be filled with a second lifting gas. An outlet port is provided that provides a passageway through which lifting gas may vented from the balloon envelope to the atmosphere when it is desired to return the balloon to the surface of the earth. After lifting gas is vented from the balloon envelope, the inner bladder remains filled with lifting gas and the inner bladder and top plate together provide a drag surface to slow the descent of the balloon to the ground.

In one aspect, a balloon is provided having a balloon envelope that is fillable with a first lifting gas, a top plate arranged at a top of the balloon envelope, an outlet port that provides a passageway from an inside of the balloon envelope to the atmosphere, an inner bladder positioned within the balloon envelope and positioned at the top of the balloon envelope and coupled to the top plate, wherein the inner bladder is fillable with a second lifting gas, wherein the outlet port is configured to vent the first lifting gas to the atmosphere while keeping the second lifting gas in the inner bladder.

In another aspect, a method of slowing the descent of a balloon envelope is provided including the steps of operating a control system for a balloon comprised of a balloon envelope filled with a first lifting gas, a top plate arranged at a top of the balloon envelope, an outlet port that provides a passageway from an inside of the balloon envelope to the atmosphere, an inner bladder positioned within the balloon envelope and positioned at a top of the balloon envelope and coupled to the top plate, wherein the inner bladder is filled with a second lifting gas, wherein the secondary bladder comprises an inner toroid balloon, wherein outlet port is configured to vent the first lifting gas to the atmosphere through the outlet port while keeping the second lifting gas within the inner bladder, receiving a signal to decrease the amount of lifting gas within the balloon envelope, and causing a vent on the outlet port to open the passageway between the inside of the balloon envelope and the atmosphere to allow lifting gas to be vented from the balloon envelope to the atmosphere.

In another aspect, a balloon is provided having a balloon envelope that is fillable with a first lifting gas, a top plate arranged at a top of the balloon envelope, an outlet port that provides a passageway from an inside of the balloon envelope to the atmosphere, an outer bladder positioned above the balloon envelope and coupled to the top plate, wherein the outer bladder is fillable with a second lifting gas, wherein the outlet port is configured to vent the first lifting gas to the atmosphere while keeping the second lifting gas in the outer bladder.

In a further aspect, a balloon is provided having means for slowing the descent of the balloon envelope after lifting gas has been vented from the balloon envelope to the atmosphere.

These as well as other aspects, advantages, and alternatives, will become apparent to those of ordinary skill in the art by reading the following detailed description, with reference where appropriate to the accompanying drawings.

DETAILED DESCRIPTION

Figure 1:
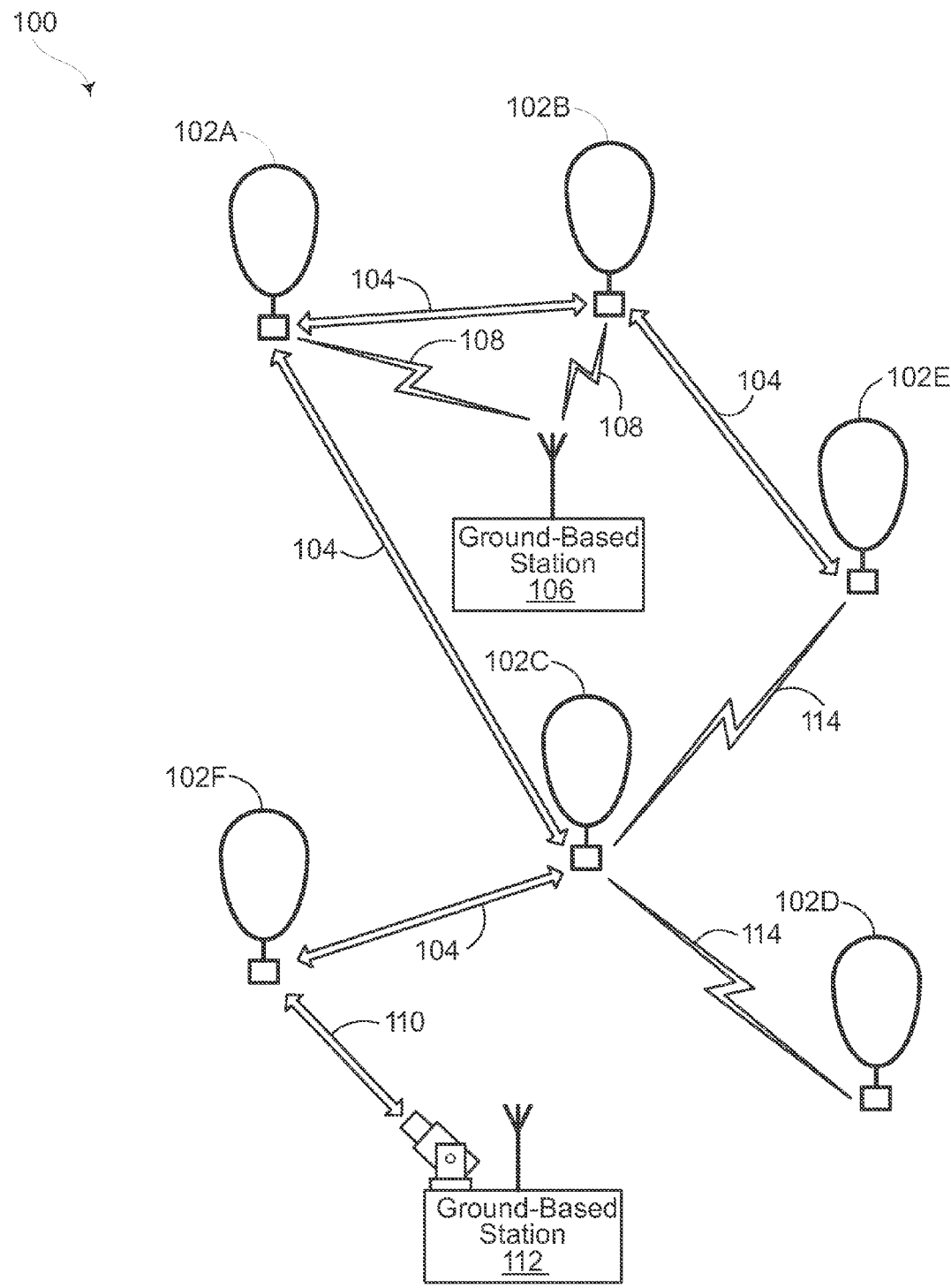
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in the data network of balloons. In an exemplary embodiment, such balloons may include an envelope and a payload. The balloon envelope is filled with a pressurized lifting gas, such as helium or hydrogen, to provide buoyancy to the balloon and to maintain the balloon envelope aloft. It will be appreciated that the lifting gas must provide a sufficient lift force to raise the balloon envelope to a desired altitude, and to maintain a desired altitude.

As a result, it is desirable to make the components of the balloon system, including the balloon envelope, payload, and other components of the balloon system, as lightweight as possible, as the lighter the overall balloon system the less lift force is required from the lifting gas. In addition, if the number of components used in the overall balloon system can be reduced, then additional equipment may be carried by the payload.

Instruments and electronic equipment may be positioned within the payload that may be used for communication, or to record various data and information. After a period of time, it may be desirable to have the payload return to the surface of the earth to retrieve and/or replace the instruments and electronic devices positioned in the payload. There may be other, perhaps more important, reasons to bring the payload down to the earth's surface. For example, the balloon payload may be brought down to provide necessary upgrades to the electronic equipment within the payload. Or, the payload may be brought down to prevent the payload from entering into unauthorized air space.

The balloon envelope may be deflated or collapsed to allow the envelope and payload to descend to the surface of the earth. For example, the balloon envelope may be caused to rip, opening a hole in the envelope to deflate the balloon. Alternately, the lifting gas may be outgassed or vented from the balloon envelope through a vent positioned on the top (or some other location) of the balloon envelope. As the lifting gas is released from the balloon envelope, the balloon envelope and payload are allowed to descend to the earth.

It may be desirable to slow the rate of descent of the envelope and payload to the earth so that the instruments or electronic devices in the payload are not damaged upon impact, and so that the data and information that has been obtained may be retrieved, as well as to reduce the risk of injury to people or property beneath payload. A parachute could be deployed from the envelope or payload to slow the rate of descent, although the remote deployment of a parachute may be unreliable. If the parachute fails to deploy, an undesirable, uncontrolled descent of the payload may occur. In addition, the use of a parachute, or backup parachute, is costly, complex, and adds a lot of undesirable weight to the system. It would therefore be desirable to provide a system for slowing the rate of descent of the envelope and payload that could be used in place of a parachute, or backup parachute.

Example embodiments may be directed to the use of a secondary bladder positioned within (or affixed directly outside) the balloon envelope, and also positioned at the top of the balloon envelope. The secondary bladder may be inflated with a lifting gas, such as helium, which may be the same as or different than the lifting gas used within the balloon envelope. The secondary bladder could be formed as an internal (or outer) toroid balloon that is attached about a top plate on the balloon envelope.

When it is desired to return the envelope and payload to the earth's surface, the lifting gas within the balloon envelope may be outgassed or vented from the balloon envelope. The internal toroid balloon may remain inflated and attached to the top plate during descent. The top plate and internal toroid balloon act like a parachute and provide drag that serves to slow the descent of the envelope and payload. At the same time, the internal toroid balloon remains filled with lifting gas that provides an upward force that also serves to slow the descent of the envelope and payload. Thus, top plate and inner toroid balloon together act like a parachute and serve to slow the descent of the balloon envelope and payload after the lifting gas in the balloon envelope has been vented to the atmosphere.

By using the secondary bladder which may take the shape of an internal (or outer) toroid balloon, the total weight of the toroid balloon weighs less than the weight of a parachute, and also provides additional buoyancy by virtue of still being filled with a lifting gas, such as helium. Accordingly, the use of a secondary bladder may eliminate the need for a parachute, or backup parachute, and slow the descent of the balloon envelope after the lifting gas has been vented from the balloon envelope, while allowing for a lighter weight, less complex, and less costly system. Moreover, the secondary bladder of lifting gas provides lift and structure to the top of the balloon envelope in the event of a catastrophic envelope failure.

Furthermore, the secondary bladder is sized to hold a sufficient volume of lifting gas to provide an adequate descent rate (e.g., 6 m/s) and to keep the system stable during normal outgassing via the top of the balloon envelope. A spacer or standpipe may be used that extends downwardly through the inner diameter of the inner toroid balloon from the top plate of the envelope. The lift gas of the balloon envelope may be outgassed through the spacer or standpipe and through an outlet port in the top plate, wherein the standpipe serves to prevent the inner toroid balloon from being sucked into the outlet port in the top plate of the envelope during outgassing of the lifting gas within the balloon envelope.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 2.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks.

Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Example Balloon Configuration

Figure 2:
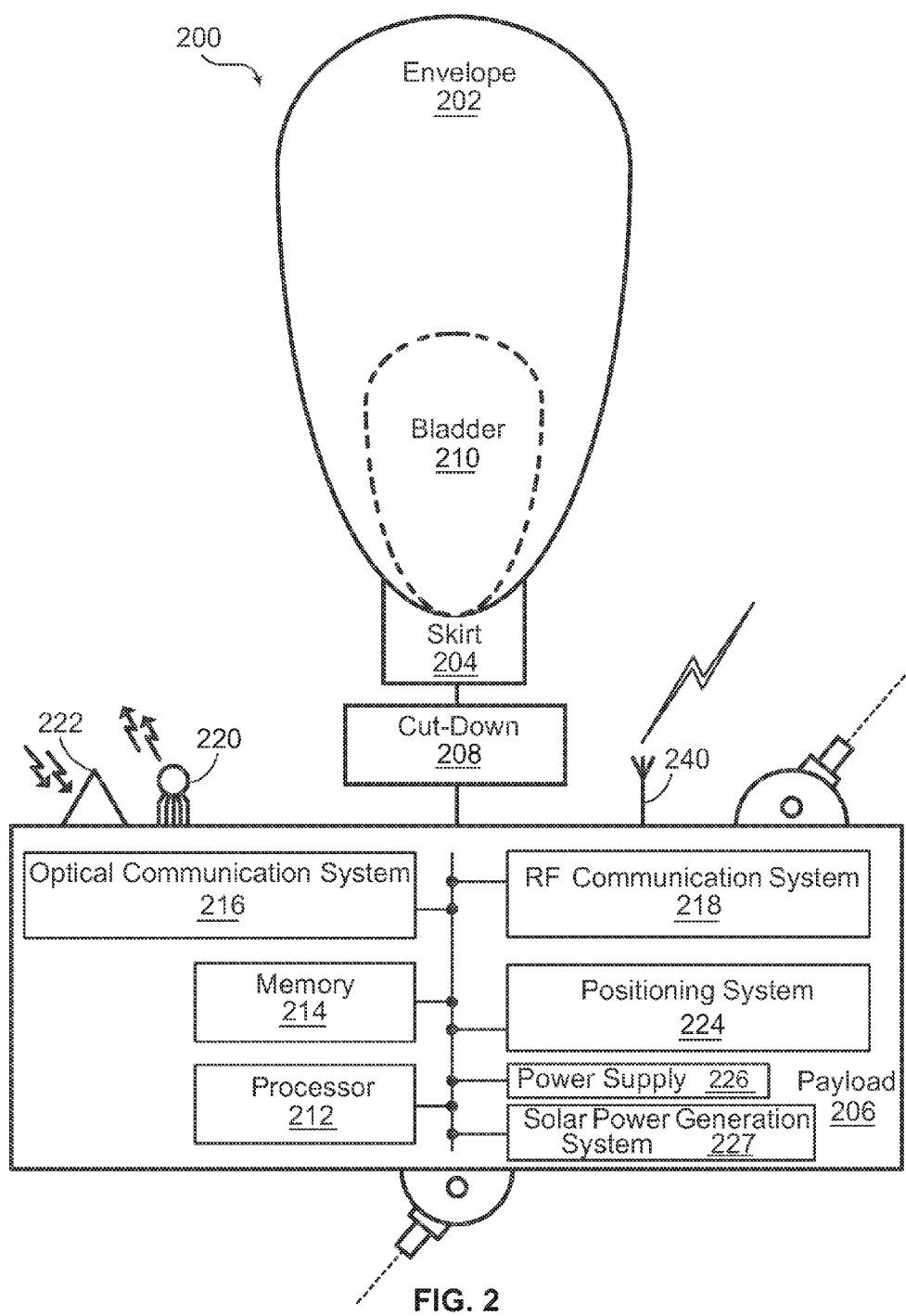
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 2 shows a high-altitude balloon 200, according to an example embodiment. As shown, the balloon 200 includes an envelope 202, a skirt 204, a payload 206, and a cut-down system 208, which is attached between the balloon 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter-than-air and provide a buoyancy force.

In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Example of a Balloon Envelope with an Inner Bladder

As disclosed in FIGS. 3-7, the present embodiments provide a balloon 10 having a balloon envelope 12 to which a payload 82 may be attached. The balloon envelope 12 is filled with a pressurized lifting gas, such as helium or hydrogen, to provide buoyancy to the balloon and to maintain the balloon 10 aloft. An inner bladder 14 is positioned within balloon envelope 14 and secured to a top plate 20 on balloon 10. The inner bladder 14 may be inflated with a lifting gas, such as helium, which may be the same as or different than the lifting gas used within the balloon envelope. For example, the lifting gas within the balloon envelope 10 could be hydrogen and the lifting gas with in the inner bladder may be helium. The inner bladder 14 could be formed as an internal toroid balloon that is attached about a top plate 20 on the balloon envelope 12. Of course, it is also possible to provide a secondary bladder which may be affixed directly outside the balloon envelope that is secured to the top plate 20. The secondary bladder may also have the shape of a toroid.

Figure 3:
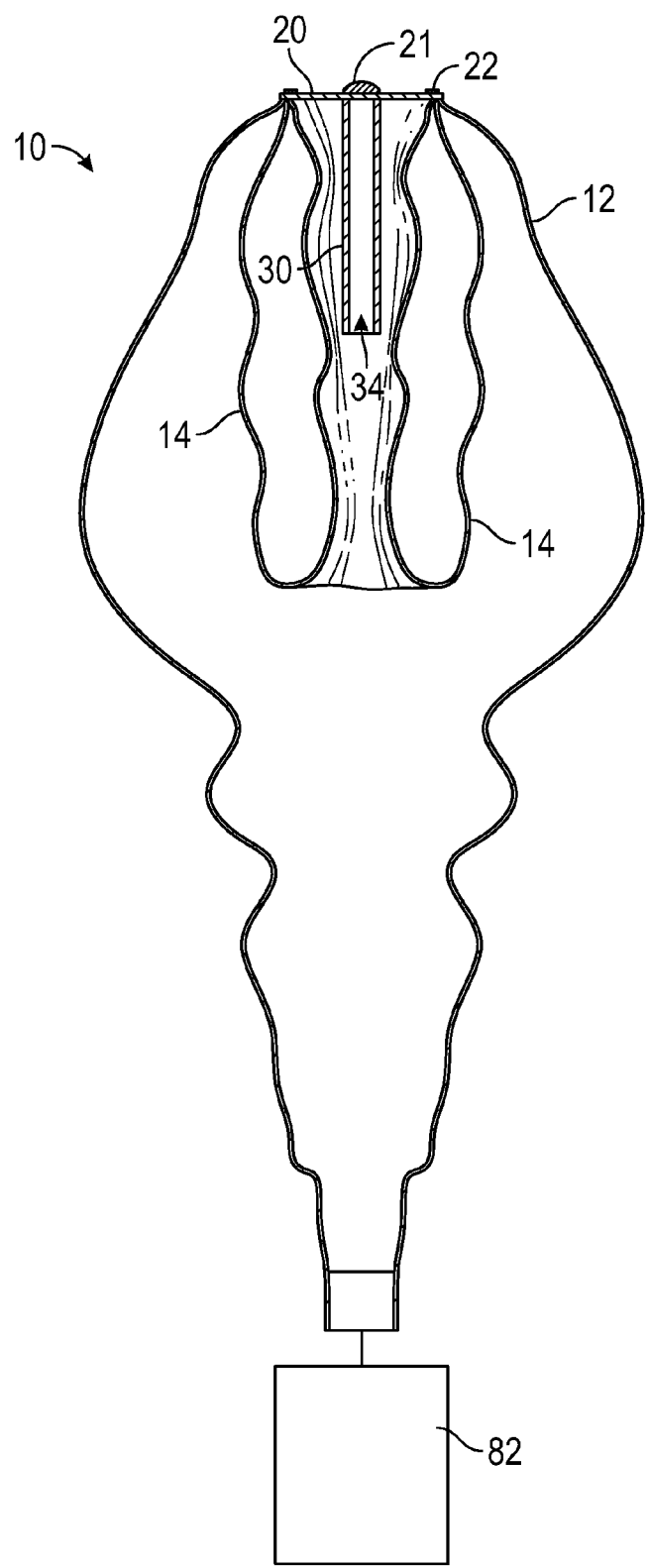
FIG. 3 shows a cross-sectional side view of a balloon 10 having a partially inflated inner toroid balloon 14 at balloon launch, according to an example embodiment.

FIG. 3 shows a cross-sectional side view of a balloon 10 having a partially inflated secondary inner bladder 14 shaped as a toroid at balloon launch, according to an example embodiment. At this point the balloon envelope 12 and the inner toroid balloon 14 are partially inflated with lifting gas such that they balloon envelope 12 and inner toroid balloon 14 are generally limp. The lifting gas expands as the balloon 10 gains altitude.

Figure 4:
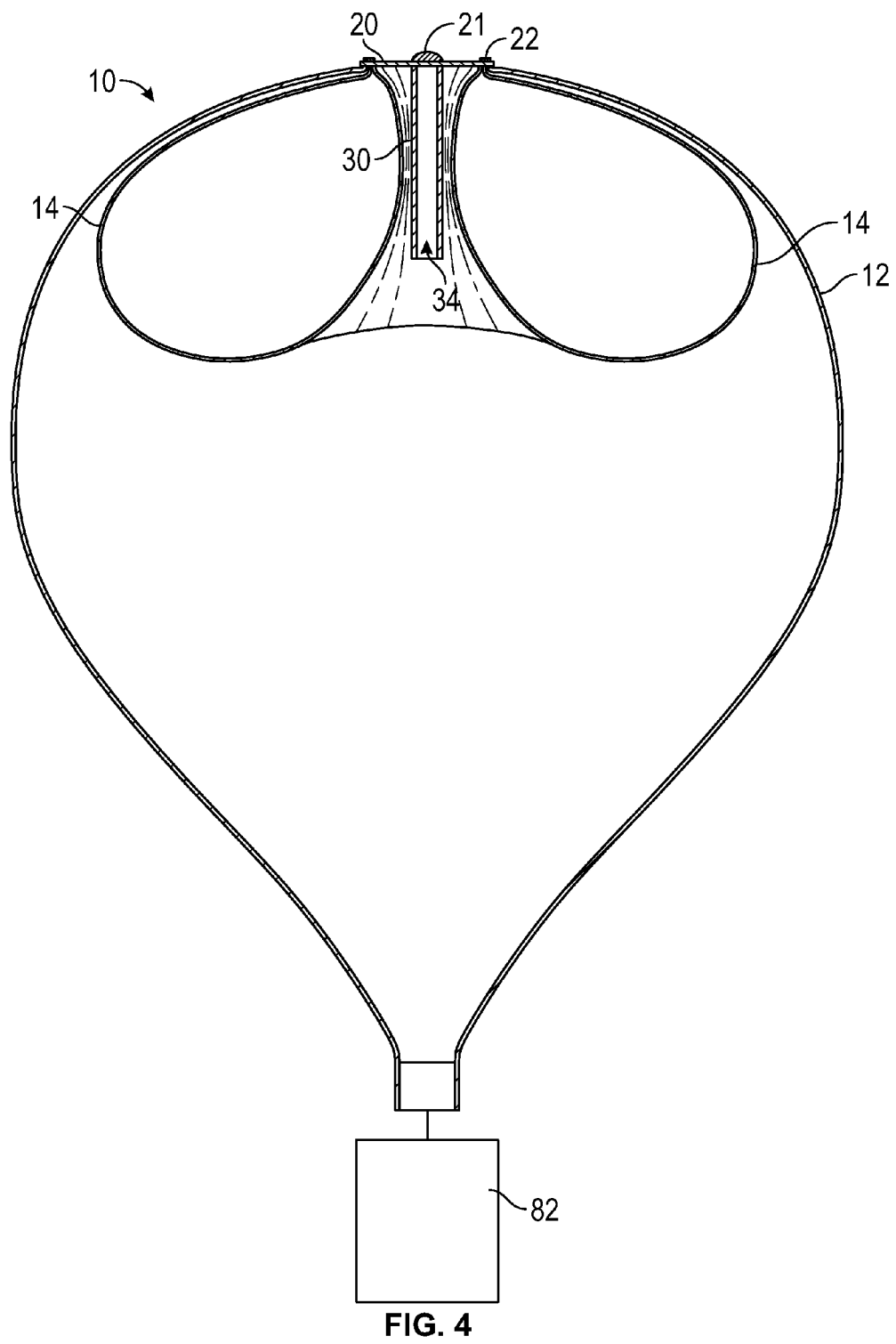
FIG. 4 shows a cross-sectional side view of the balloon 10 shown in FIG. 3 with the balloon envelope 12 and inner toroid balloon 14 inflated at altitude, according to an example embodiment.

FIG. 4 shows a cross-sectional side view of the balloon 10 shown in FIG. 3 with the balloon envelope 12 and inner toroid balloon 14 inflated at altitude, according to an example embodiment. The inner toroid balloon 14 may be made of two layers of thin film, such as polyethylene cut into a circle. The inner diameter may be on the order of 6 to 12 inches (or more), and the outer diameter could be on the order of 40 feet in diameter. In a preferred embodiment, the ratio between the outer diameter and the inner diameter (defined herein in an uninflated state) is 10:1 to 80:1, and most preferably 40:1 to 80:1, inclusive.

The outside seam of the circles can be heat sealed and the inside seam may also be heat sealed. During construction, the two layers of film that will form the inner toroid balloon 14 are put into the envelope 12 and sandwiched at the top plate 20, and the ends of the material forming the inner diameter of the inner toroid balloon 14, as well as the upper portion of balloon envelope 12 are shown positioned beneath structural ring 22.

A standpipe or spacer 30 is shown that extends downwardly through the inner diameter of the inner toroid balloon 14 from the top plate 20 of the balloon envelope 12. Standpipe or spacer provides a passageway from inside the balloon envelope 12 to the atmosphere that can be used to vent lifting gas from the balloon envelope 12 through outlet port 21. A vent or valve may be used to open or close the outlet port as desired. For example, a linear actuator could be used in connection with an umbrella valve to open and close the outlet port.

Figure 5:
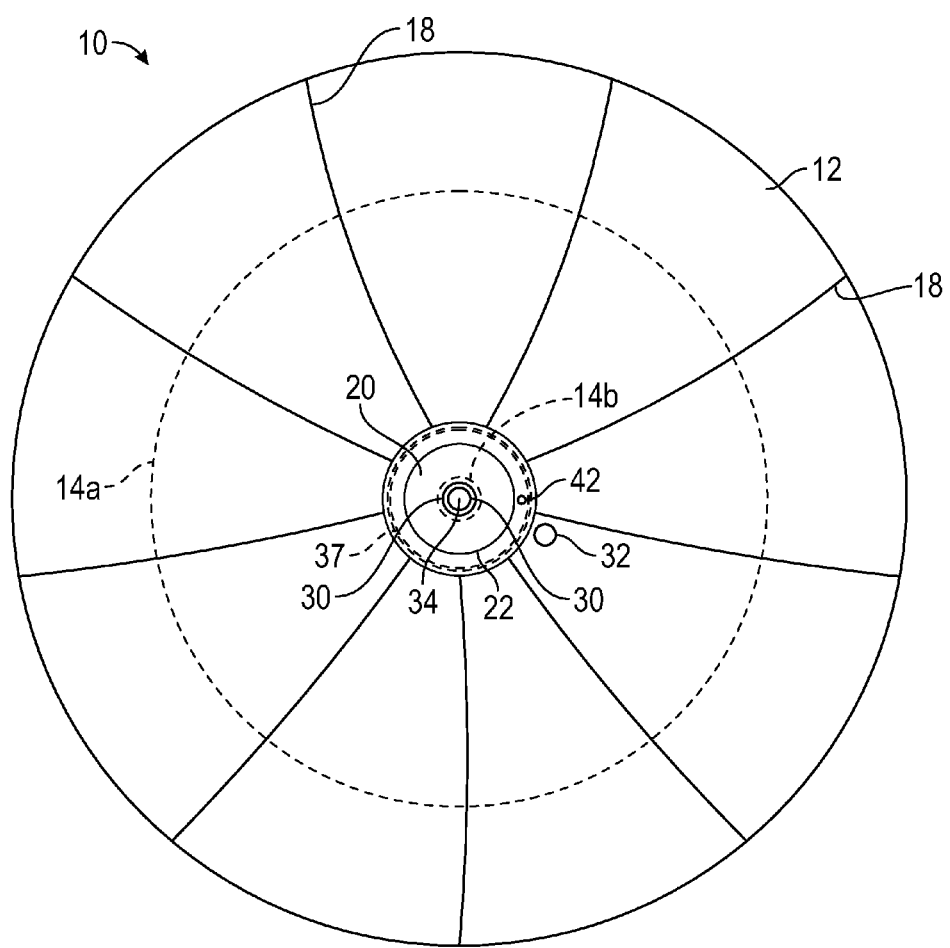
FIG. 5 shows a top view of the balloon 10 shown in FIG. 4.

FIG. 5 shows a top view of the balloon 10 shown in FIG. 4. As series of longitudinal tendons 18 are shown extending down the outside of balloon envelope 12. The longitudinal tendons 18 are designed to provide additional strength and stability to the balloon envelope. The outer edge 14a of the inner toroid balloon is illustrated within balloon envelope 12. The inner edge 14b of the inner toroid balloon is illustrated positioned about standpipe 30 and passageway 34.

A fill port 32 for the inner toroid balloon 14 may be installed near the top plate 20 that extends through the balloon envelope 12 and the inner toroid balloon 14, or a port 42 may be installed in structural ring 22 that fills directly into the inner toroid balloon 14, bypassing the main balloon envelope 12. A load ring 37 is also illustrated beneath the structural ring 22 that the top edges of balloon envelope 12 may be secured to.

Figure 6:
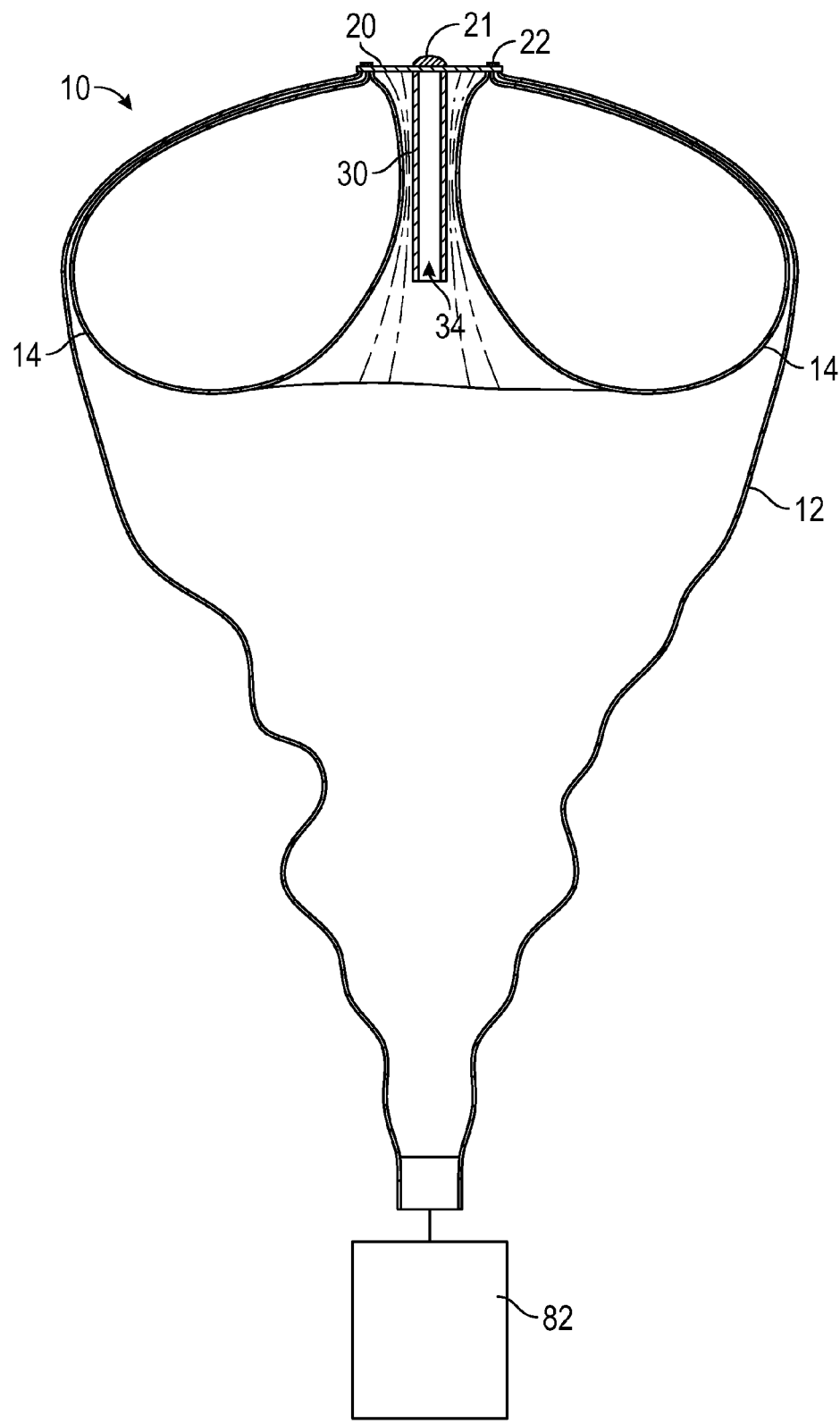
FIG. 6 is a cross-sectional side view of the balloon 10 shown in FIGS. 4 and 5 after lifting gas has been vented from balloon envelope 12.

When it is desired to return the balloon envelope 12 and payload 82 to the earth's surface, the lifting gas within the balloon envelope 12 may be outgassed or vented from the balloon envelope 12. The internal toroid balloon 14 may remain inflated and attached to the top plate 20 during descent. FIG. 6 is a cross-sectional side view of the balloon 10 shown in FIGS. 4 and 5 after lifting gas has been vented from balloon envelope 12. The inner bladder 14 is sized to hold a sufficient volume of lift gas to provide an adequate descent rate (e.g., 6 m/s) and to keep the system stable during normal outgassing via the top of the balloon envelope 12. The spacer or standpipe 30 extends downwardly through the inner diameter of the inner toroid balloon 14 and provides a passageway 34 from the inside of the balloon envelope 12 to the atmosphere. The lift gas of the balloon envelope 12 may be outgassed through passageway 34 of the spacer or standpipe 30 and through the outlet port 21 in the top plate 20, wherein the standpipe 30 serves to prevent the inner toroid balloon 14 from being sucked into the outlet port 21 in the top plate 20 of the balloon envelope 12 during outgassing of the lifting gas within the balloon envelope 12.

Figure 7:
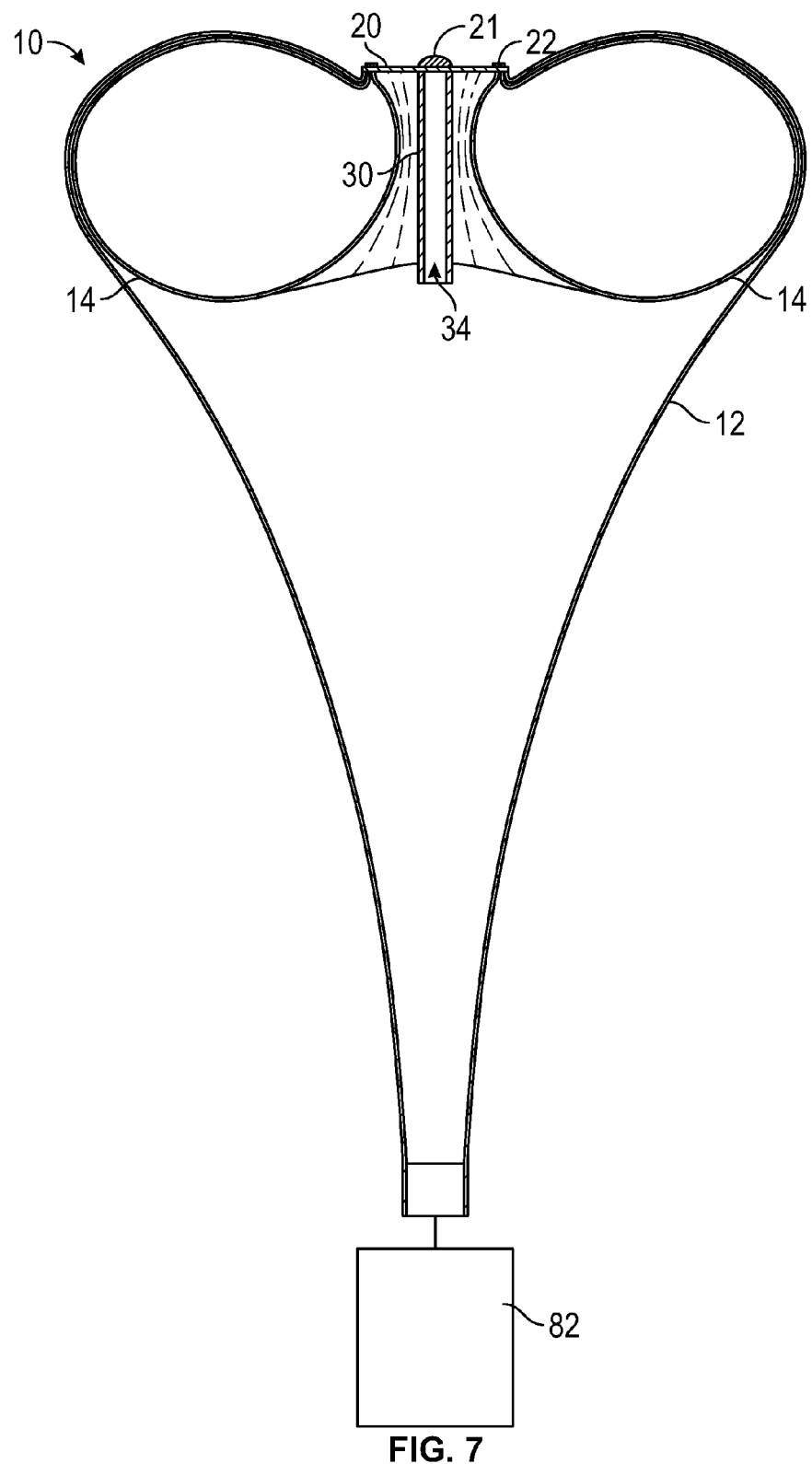
FIG. 7 is cross-sectional side view of balloon 10 shown in FIGS. 4-6 during descent with inner toroid balloon 14 and top plate 20 acting as a parachute to slow the descent of balloon 10, according to an example embodiment.

FIG. 7 is cross-sectional side view of balloon 10 shown in FIGS. 4-6 during descent with inner toroid balloon 14 and top plate 20 acting as a parachute to slow the descent of balloon 10, according to an example embodiment. The top plate 20 and internal toroid balloon 14 provide drag that serves to slow the descent of the balloon envelope 12 and payload 82 during descent. At the same time, the internal toroid balloon 14 remains filled with lifting gas that provides an upward force that also serves to slow the descent of the envelope 12 and payload 82. Thus, top plate 20 and inner toroid balloon 14 together act like a parachute and serve to slow the descent of the balloon envelope 12 and payload 82 after the lifting gas in the balloon envelope 12 has been vented to the atmosphere. Depending on the weight of the balloon envelope 12 and payload 82, air may become trapped between the inner diameter of the inner toroid balloon 14 and top plate 20, serving to provide further drag during the descent of the balloon 10.

Using an inner bladder 14 which may take the shape of an internal toroid balloon positioned about a top plate 20 serves to act as a parachute. However, the total weight of the internal toroid balloon 14 weighs less than the weight of a parachute, and also provides additional buoyancy by virtue of still being filled with a lifting gas, such as helium. Accordingly, the use of an inner bladder 14 may eliminate the need for a parachute, or backup parachute, and slow the descent of the balloon 10 after the lifting gas has been vented from the balloon envelope 12, while allowing for a lighter weight, less complex, and less costly system. Moreover, the inner bladder 14 filled with lifting gas provides lift and structure to the top of the balloon envelope 12 in the event of a catastrophic envelope failure.

The inner toroid balloon 14 may be deflated independently from the balloon envelope 12 so that the inner toroid balloon 14 remains filled with lifting gas during the descent of balloon 10. After reaching the ground, the inner toroid balloon 14 may be deflated so that the envelope 12 is not dragged along the ground by the wind. Further, the lifting gas within the inner toroid balloon 14 is preferably helium, an inert gas; whereas the lifting gas within the envelope may be hydrogen (or helium), as the lifting gas within the balloon envelope 12 is outgassed and vented before reaching the ground.

4. Example Method of Slowing the Descent of a Balloon

Figure 8:
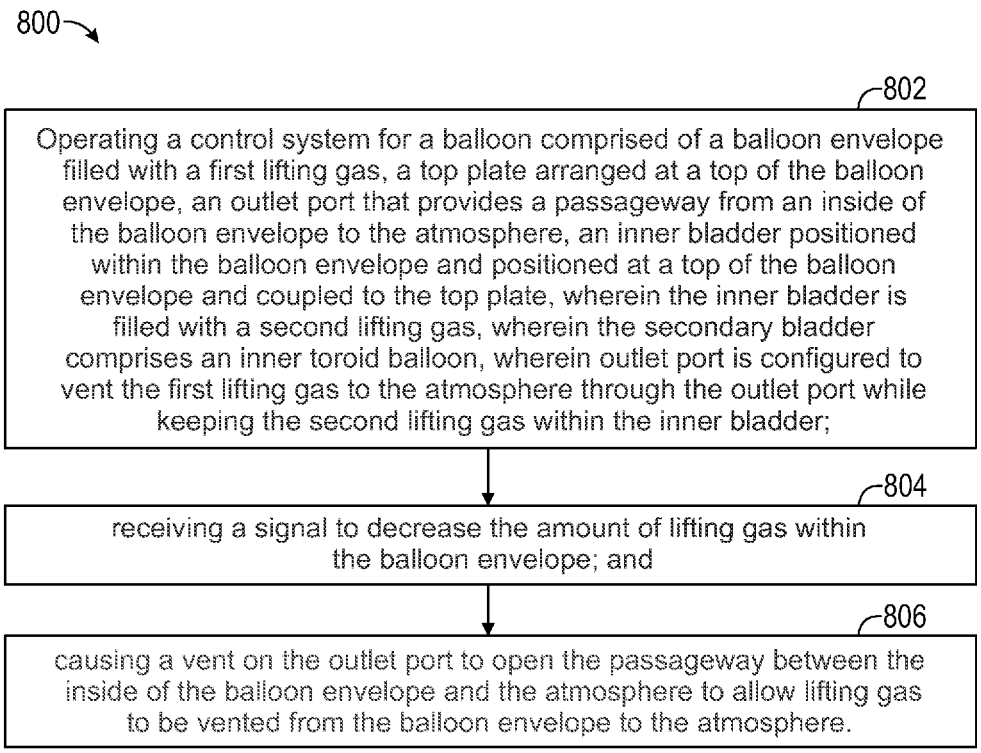
FIG. 8 is a method, according to an example embodiment.

FIG. 8 is directed to method 1000 that may be used for slowing the descent of a balloon. Method 1000 is provided that includes the step 1002 of operating a control system for a balloon comprised of a balloon envelope filled with a first lifting gas, a top plate secured to a top of the balloon envelope, an outlet port that provides a passageway from an inside of the balloon envelope to the atmosphere, a secondary bladder positioned within the balloon envelope and positioned at a top of the balloon envelope and secured to the top plate, wherein the second bladder is filled with a second lifting gas, wherein the secondary bladder comprises an inner toroid balloon, wherein the first lifting gas may be vented to the atmosphere through the outlet port while the secondary bladder remains filled with the second lifting gas.

Method 1000 further includes the step 1004 of receiving a signal to decrease the amount of air within the balloon envelope, and the step 1006 of causing a vent on the outlet port to open the passageway between the inside of the balloon envelope and the atmosphere to allow lifting gas to be vented from the balloon envelope to the atmosphere.

With method 1000, the inner toroid balloon and top plate together provide a drag surface to slow the descent of the balloon envelope after lifting gas has been vented to the atmosphere from the balloon envelope.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
   a balloon envelope that is fillable with a first lifting gas;
   a top plate arranged at a top of the balloon envelope;
   an outlet port that provides a passageway from an inside of the balloon envelope to the atmosphere;
   an inner bladder positioned within the balloon envelope and positioned at the top of the balloon envelope and coupled to the top plate, wherein the inner bladder is fillable with a second lifting gas;
   wherein the outlet port is configured to vent the first lifting gas to the atmosphere while keeping the second lifting gas in the inner bladder.

2. The apparatus of claim 1, wherein the inner bladder comprises an inner toroid balloon.

3. The apparatus of claim 2, wherein the outlet port is positioned in the top plate.

4. The apparatus of claim 3, wherein a standpipe extends downwardly from the outlet port and through an inner diameter of the inner toroid balloon.

5. The apparatus of claim 1, wherein the first lifting gas is the same as the second lifting gas.

6. The apparatus of claim 2, wherein the second lifting gas is helium.

7. The apparatus of claim 2, wherein a structural ring is positioned around the periphery of the top plate.

8. The apparatus of claim 7, wherein a fill port is positioned in the structural ring that allows lifting gas to fill the inner toroid balloon.

9. The apparatus of claim 2, wherein the balloon envelope may be inflated and deflated independently from the inner toroid balloon.

10. The apparatus of claim 2, wherein edges of an inner diameter of the inner toroid balloon are sandwiched together with the balloon envelope and the top plate.

11. The apparatus of claim 2, wherein a ratio of an outer diameter of the inner toroid balloon and an inner diameter of the inner toroid balloon is between 10:1 and 80:1 inclusive.

12. The apparatus of claim 11, wherein the ratio of the outer diameter of the inner toroid balloon and the inner diameter of the inner toroid balloon is between 40:1 and 80:1, inclusive.

13. The apparatus of claim 6, wherein the volume of lifting gas within the inner toroid balloon is 150 m^3 at altitude.

14. The apparatus of claim 2, wherein the inner toroid balloon and top plate together provide a drag surface to slow the descent of the balloon envelope after lifting gas has been vented to the atmosphere from the balloon envelope.

15. The apparatus of claim 14, wherein air is trapped between the top plate and an inner diameter of the inner toroid balloon during the descent of the balloon envelope.

16. The apparatus of claim 2, wherein when the balloon envelope is launched from the ground, the inner toroid balloon is only partially inflated such that the inner toroid balloon is generally limp within the balloon envelope when the balloon envelope is launched.

17. A computer-implemented method, comprising:
operating a control system for a balloon comprised of a balloon envelope filled with a first lifting gas, a top plate arranged at a top of the balloon envelope, an outlet port that provides a passageway from an inside of the balloon envelope to the atmosphere, a bladder positioned at a top of the balloon envelope and coupled to the top plate, wherein the bladder is filled with a second lifting gas, wherein the bladder comprises a toroid balloon, wherein outlet port is configured to vent the first lifting gas to the atmosphere through the outlet port while keeping the second lifting gas within the bladder;
receiving a signal to decrease the amount of lifting gas within the balloon envelope; and
causing a vent on the outlet port to open the passageway between the inside of the balloon envelope and the atmosphere to allow lifting gas to be vented from the balloon envelope to the atmosphere.

18. The method of claim 17, wherein the toroid balloon is positioned within the balloon envelope, the outlet port is positioned in the top plate, and a standpipe extends downwardly from the outlet port and through an inner diameter of the inner toroid balloon.

19. The method of claim 17, wherein edges of an inner diameter of the toroid balloon are sandwiched together with the balloon envelope and the top plate.

20. The method of claim 17, wherein a ratio of an outer diameter of the toroid balloon and an inner diameter of the toroid balloon is between 10:1 and 80:1 inclusive.

21. The method of claim 17, wherein the toroid balloon and top plate together provide a drag surface to slow the descent of the balloon envelope after lifting gas has been vented to the atmosphere from the balloon envelope.

22. An apparatus comprising:
a balloon envelope that is fillable with a first lifting gas;
a top plate arranged at a top of the balloon envelope;
an outlet port that provides a passageway from an inside of the balloon envelope to the atmosphere;
an outer bladder positioned above the balloon envelope and coupled to the top plate, wherein the outer bladder is fillable with a second lifting gas;
wherein the outlet port is configured to vent the first lifting gas to the atmosphere while keeping the second lifting gas in the outer bladder.

23. The apparatus of claim 22, wherein the outer bladder comprises an outer toroid balloon.

* * * * *